United States Patent
Harada et al.

(10) Patent No.: US 9,157,521 B2
(45) Date of Patent: Oct. 13, 2015

(54) PLANETARY CARRIER

(71) Applicant: AISIN AW CO., LTD., Anjo-shi, Aichi-ken (JP)

(72) Inventors: Takashi Harada, Toyota (JP); Chihiro Onishi, Gamagori (JP); Masaki Kanda, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/241,632

(22) PCT Filed: Nov. 5, 2012

(86) PCT No.: PCT/JP2012/078626
§ 371 (c)(1),
(2) Date: Feb. 27, 2014

(87) PCT Pub. No.: WO2013/088860
PCT Pub. Date: Jun. 20, 2013

(65) Prior Publication Data
US 2014/0206498 A1 Jul. 24, 2014

(30) Foreign Application Priority Data
Dec. 16, 2011 (JP) .................................. 2011-275986

(51) Int. Cl.
*F16H 57/08* (2006.01)
*F16H 3/66* (2006.01)

(52) U.S. Cl.
CPC .............. *F16H 57/082* (2013.01); *F16H 3/663* (2013.01); *F16H 2200/0052* (2013.01); *F16H 2200/2007* (2013.01); *F16H 2200/2023* (2013.01);
(Continued)

(58) Field of Classification Search
CPC .......... F16H 57/082; F16H 2200/2023; F16H 2200/2066; F16H 2200/2082; F16H 3/663
See application file for complete search history.

(56) References Cited

U.S. PATENT DOCUMENTS 3,527,121 A * 9/1970 Moore ........................... 475/338
3,939,736 A * 2/1976 Morin ........................... 475/338
(Continued)

FOREIGN PATENT DOCUMENTS

JP   A-5-256339   10/1993
JP   A-6-81907    3/1994
(Continued)

OTHER PUBLICATIONS

International Search Report issued in International Application No. PCT/JP2012/078626 mailed Jan. 29, 2013.

*Primary Examiner* — Tisha Lewis
(74) *Attorney, Agent, or Firm* — Oliff PLC

(57) ABSTRACT

A planetary carrier having: a first carrier member that has a first shaft support portion that supports respective first ends of a plurality of pinion shafts inserted through the pinion gears, and a plurality of first leg portions extended from the first shaft support portion; a second carrier member that has a second shaft support portion that supports respective second ends of the plurality of pinion shafts, and a plurality of second leg portions extended from the second shaft support portion; and an annular member that has one end surface with which the plurality of first leg portions of the first carrier member and the plurality of second leg portions of the second carrier member are brought into abutment, and a welded portion to which the plurality of first leg portions and the plurality of second leg portions are welded at different positions in a circumferential direction.

9 Claims, 16 Drawing Sheets

(52) U.S. Cl.
CPC . *F16H2200/2043* (2013.01); *F16H 2200/2066* (2013.01); *F16H 2200/2082* (2013.01); *F16H 2200/2097* (2013.01)

(56) References Cited

U.S. PATENT DOCUMENTS

| | | | | |
|---|---|---|---|---|
| 3,964,334 | A * | 6/1976 | Hicks | 475/347 |
| 6,434,827 | B1 * | 8/2002 | Trent et al. | 29/893.1 |
| 6,449,862 | B1 * | 9/2002 | Stiner | 33/567 |
| 7,223,198 | B2 * | 5/2007 | Kimes et al. | 475/331 |
| 2002/0178851 | A1 * | 12/2002 | Giuriati | 74/413 |
| 2006/0089228 | A1 | 4/2006 | Nakagawa et al. | |
| 2006/0196307 | A1 * | 9/2006 | Radinger et al. | 74/640 |
| 2008/0188338 | A1 * | 8/2008 | Kimes et al. | 475/148 |
| 2010/0078282 | A1 * | 4/2010 | Kito et al. | 192/48.1 |

FOREIGN PATENT DOCUMENTS

| | | |
|---|---|---|
| JP | A-2006-125425 | 5/2006 |
| JP | A-2008-89051 | 4/2008 |

* cited by examiner

FIG. 3

|   |   | C-1 | C-2 | C-3 | B-1 | B-2 | F-1 |
|---|---|---|---|---|---|---|---|
| P |   |   |   |   |   |   |   |
| REV |   |   |   | ○ |   | ○ |   |
| N |   |   |   |   |   |   |   |
| D | 1st | ○ |   |   |   | ● | ○ |
|   | 2nd | ○ |   |   | ○ |   |   |
|   | 3rd | ○ |   | ○ |   |   |   |
|   | 4th | ○ | ○ |   |   |   |   |
|   | 5th |   | ○ | ○ |   |   |   |
|   | 6th |   | ○ |   | ○ |   |   |

※ ○: ENGAGED, ●: ENGAGED WITH ENGINE BRAKE IN OPERATION

PLANETARY CARRIER

TECHNICAL FIELD

The present invention relates to a planetary carrier that rotatably supports a plurality of pinion gears.

BACKGROUND ART

As a planetary gear including a carrier that rotatably supports short pinions and long pinions that mesh with the short pinions, there has hitherto been known a planetary gear including a middle member having a base plate portion that supports respective first ends of pinion shafts of the short pinions, a one-side member having a bottom plate portion and a peripheral edge portion that integrally extends toward one side in the axial direction from the periphery of the bottom plate portion and disposed on one side of the base plate portion of the middle member in the axial direction so that the bottom plate portion supports respective first ends of pinion shafts of the long pinions, and an other-side member having a bottom plate portion and a peripheral edge portion that integrally extends toward the other side in the axial direction from the periphery of the bottom plate portion and disposed on the other side of the base plate portion of the middle member in the axial direction so that the bottom plate portion supports respective second ends of the pinion shafts of the short pinions and respective second ends of the pinion shafts of the long pinions (see Patent Document 1, for example). In the planetary gear, a frame body that supports the short pinion and the long pinion is structured by securing the peripheral edge portion of the one-side member and the peripheral edge portion of the other-side member to respective sides of the base plate portion of the middle member in the axial direction. That is, the distal end of the peripheral edge portion of the one-side member is inserted into a long hole formed in the base plate portion of the middle member, and welded to the base plate portion. Meanwhile, the distal end of the peripheral edge portion of the other-side member is welded to a connection portion formed on the base plate portion of the middle member to be positioned on the outer peripheral side of the long hole.

RELATED-ART DOCUMENTS

Patent Documents

[Patent Document 1] Japanese Patent Application Publication No. 2008-89051 (JP 2008-89051 A)

SUMMARY OF THE INVENTION

In manufacturing the planetary carrier according to the related art described above, however, it is necessary to assemble the one-side member to the middle member from the one side in the axial direction and weld the one-side member to the base plate portion from the other side in the axial direction, and to then assemble the other-side member to the middle member from the other side in the axial direction and weld the other-side member to the base plate portion from the one side in the axial direction at positions that are different in the radial direction from positions at which the one-side member is welded to the base plate portion. This makes assembly and welding of the members troublesome and increases the number of welding steps for the planetary carrier according to the related art described above, which increases the cost of manufacture.

It is therefore a main object of the present invention to facilitate manufacture of a planetary carrier and reduce the cost of manufacture.

In order to achieve the foregoing main object, the planetary carrier according to the present invention adopts the following means.

The present invention provides a planetary carrier that rotatably supports a plurality of pinion gears, characterized by including:

a first carrier member that has a first shaft support portion that supports respective first ends of a plurality of pinion shafts inserted through the pinion gears, and a plurality of first leg portions extended from the first shaft support portion;

a second carrier member that has a second shaft support portion that supports respective second ends of the plurality of pinion shafts, and a plurality of second leg portions extended from the second shaft support portion; and an annular member that has one end surface with which the plurality of first leg portions of the first carrier member and the plurality of second leg portions of the second carrier member are brought into abutment, and a welded portion to which the plurality of first leg portions and the plurality of second leg portions are welded at different positions in a circumferential direction.

In manufacturing the planetary carrier, the plurality of first leg portions of the first carrier member and the plurality of second leg portions of the second carrier member are brought into abutment with one end surface of the annular member, and welded to the welded portion of the annular member at different positions in the circumferential direction. This allows the first and second leg portions, that is, both the first and second carrier members, to be easily fixed to the annular member by performing welding along a circumference around the axis of the annular member. Thus, according to the present invention, it is possible to facilitate manufacture of the planetary carrier, and to reduce the cost of manufacture by reducing the number of welding steps. The welded portion of the annular member may be the one end surface described above, or may be a portion of the annular member other than the one end surface.

The plurality of first leg portions and the plurality of second leg portions may abut against the one end surface of the annular member at different positions in the circumferential direction.

Further, an annular projection portion that projects in an axial direction to surround the one end surface may be formed on the annular member, and the welded portion may be an inner peripheral surface of the annular projection portion. This allows the first and second carrier members to be centered with respect to the annular member by the annular projection portion, which makes it possible to improve the assembly accuracy of the planetary carrier. With the inner peripheral surface of the annular projection portion serving as the welded portion, in addition, both the first and second carrier members can be easily fixed to the annular member by performing welding from one direction.

Distal ends of free end portions of the first and second leg portions may each be formed in an arcuate shape. This makes it possible to improve the accuracy in centering the first and second carrier members achieved by the annular projection portion, and to weld the first and second leg portions to the annular member more strongly by performing welding along the inner peripheral surface of the annular projection portion.

Further, the free end portions of the plurality of first leg portions may abut against the one end surface of the annular member, and at least a part of the first carrier member may be disposed on an inner peripheral side of the annular member;

and the second carrier member may be disposed such that the plurality of second leg portions abut against the one end surface of the annular member and the second shaft support portion faces the first shaft support portion of the first carrier member. This allows the first leg portions to abut against the one end surface by bringing the first carrier member closer to the annular member from one side, and allows the second leg portions to abut against the one end surface by bringing the second carrier member closer to the annular member from the one side, which makes it possible to easily assemble the first and second carrier members to the annular member.

The first leg portions may each include a basal portion extended in an axial direction from the first shaft support portion, and a free end portion extended outward in a radial direction from the basal portion. This makes it possible to easily structure the first carrier member, at least a part of which is disposed in the annular member such that the free end portions of the plurality of first leg portions abut against the one end surface of the annular member.

Further, the basal portions of the first leg portions may be extended from the first shaft support portion via straight bent portions. This makes it possible to improve the strength of the first leg portions with stress concentration suppressed compared to a case where the basal portions of the first leg portions are extended from the first shaft support portion via curved (arcuate) bent portions.

The planetary carrier may further include: a plurality of second pinion gears that are shorter than the pinion gears; a plurality of second pinion shafts inserted through the second pinion gears; and a center plate that has first pinion shaft insertion portions through which the pinion shafts supported by the first carrier member and the second carrier member are inserted, and abutment portions that are brought into abutment with the one end surface of the annular member, the center plate being configured to support the second pinion shafts together with at least one of the first and second carrier members, and the abutment portions may be welded to the welded portion at positions that are different in the circumferential direction from positions at which the plurality of first leg portions and the plurality of second leg portions are welded to the welded portion.

The planetary carrier is applied to a double-pinion type or Ravigneaux type planetary gear mechanism having two types of, that is, long and short, pinion gears, and includes the center plate which has the plurality of abutment portions which are brought into abutment with the one end surface of the annular member to be welded to the annular member, the center plate being configured to support the second pinion shafts. In manufacturing the planetary carrier, the plurality of first leg portions of the first carrier member, the plurality of second leg portions of the second carrier member, and the plurality of abutment portions of the center plate are brought into abutment with the one end surface of the annular member at different positions in the circumferential direction, and the first and second leg portions and the abutment portions of the center plate are welded to the annular member. By bringing both the first and second leg portions and the plurality of abutment portions of the center plate into abutment with the one end surface, that is, an identical end surface, of the annular member and performing welding along the one end surface of the annular member in this way, both the first and second carrier members and the center plate can be easily fixed to the annular member, and all of the first shaft support portion, the second shaft support portion, and the center plate can be accurately disposed in parallel with each other. Consequently, it is possible to easily and accurately manufacture the planetary carrier to be applied to the double-pinion or Ravigneaux type planetary gear mechanism, and to reduce the cost of manufacture by reducing the number of welding steps.

Further, both ends of the plurality of second pinion shafts may be supported by the first and second carrier members. This enables the second pinion shafts to be strongly supported by the first and second carrier members and the center plate.

BRIEF DESCRIPTION OF THE DRAWINGS

FIG. 3 is an operation table illustrating the relationship between each shift speed of the automatic transmission 25 and operating states of clutches and brakes.

MODES FOR CARRYING OUT THE INVENTION

Now, an embodiment of the present invention will be described below.

Figure 1:
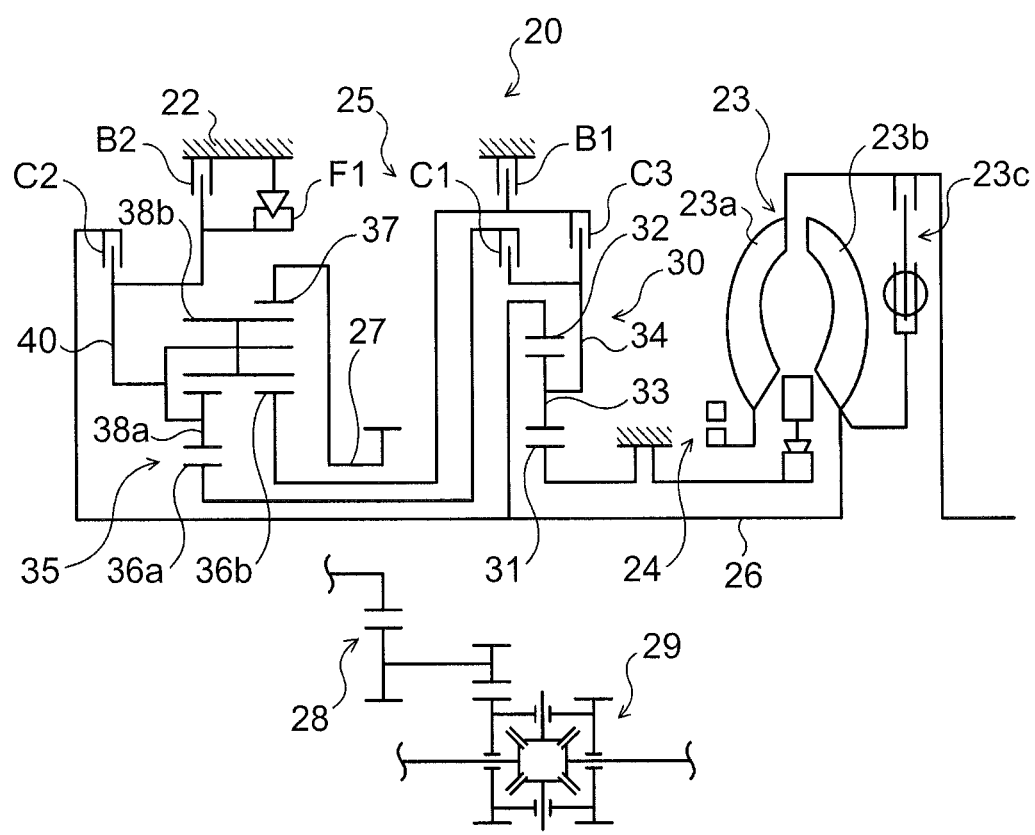
FIG. 1 illustrates a schematic configuration of a power transfer device 20 including an automatic transmission 25 including a Ravigneaux type planetary gear mechanism 35 having a planetary carrier 40 according to an embodiment of the present invention.

FIG. 1 illustrates a schematic configuration of a power transfer device 20 including an automatic transmission 25 including a Ravigneaux type planetary gear mechanism 35 having a planetary carrier 40 according to an embodiment of the present invention. The power transfer device 20 illustrated in the drawing is connected to a crankshaft of an engine (not illustrated) mounted on a vehicle to transfer power from the engine to left and right drive wheels (not illustrated), and includes a transmission case 22, a torque converter 23 housed inside the transmission case 22, an oil pump 24, the automatic transmission 25, a differential mechanism (differential gear) 29, and so forth.

The torque converter 23 includes a pump impeller 23a on the input side connected to the crankshaft of the engine, a turbine runner 23b on the output side connected to an input shaft (input member) 26 of the automatic transmission 25, and a lock-up clutch 23c. The oil pump 24 is structured as a gear pump including a pump assembly composed of a pump body and a pump cover, and an externally toothed gear connected to the pump impeller 23a of the torque converter 23 via a hub. The oil pump 24 is driven by power from the engine to suction hydraulic oil (ATF) reserved in an oil pan (not illustrated) and pump the hydraulic oil to a hydraulic control device (not illustrated).

Figure 2:
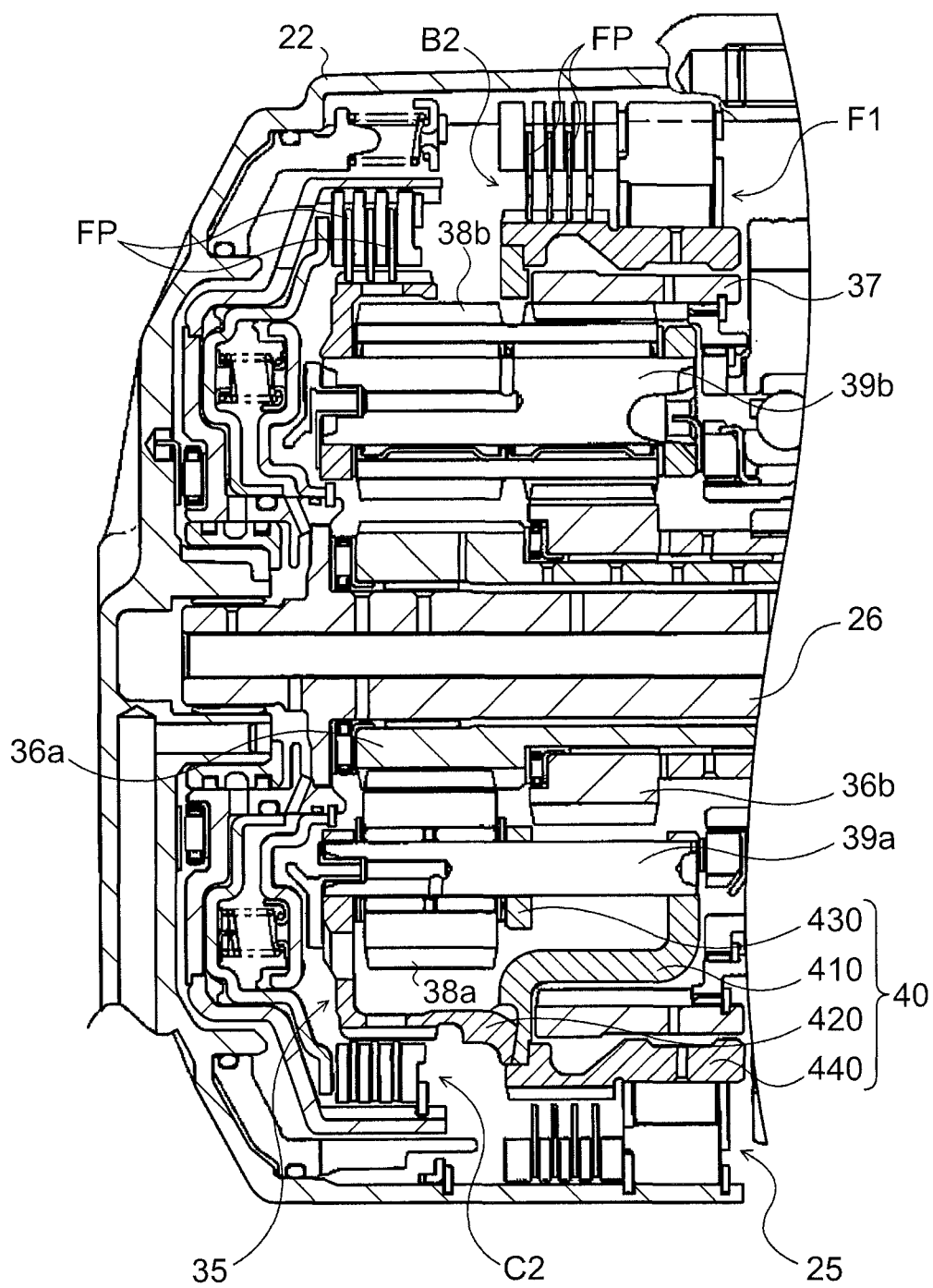
FIG. 2 is an enlarged sectional view of an essential portion of the automatic transmission 25.

The automatic transmission 25 is structured as a 6-speed transmission. As illustrated in FIGS. 1 and 2, the automatic transmission 25 includes a single-pinion type planetary gear mechanism 30, the Ravigneaux type planetary gear mechanism 35, and three clutches C1, C2, and C3, two brakes B1 and B2, and a one-way clutch F1 that change a power transfer path from the input side to the output side. The single-pinion type planetary gear mechanism 30 has a sun gear 31 which is an externally toothed gear fixed to the transmission case 22, a ring gear 32 which is an internally toothed gear disposed concentrically with the sun gear 31 and connected to the input shaft 26, a plurality of pinion gears 33 meshed with the sun gear 31 and meshed with the ring gear 32, and a planetary carrier 34 that rotatably and revolvably holds the plurality of pinion gears 33.

The Ravigneaux type planetary gear mechanism 35 has two sun gears 36a and 36b which are each an externally toothed gear, a ring gear 37 which is an internally toothed gear fixed to an output shaft (output member) 27 of the automatic transmission 25, a plurality of short pinion gears 38a meshed with the sun gear 36a, a plurality of long pinion gears 38b meshed with the sun gear 36b and the plurality of short pinion gears 38a and meshed with the ring gear 37, and the planetary carrier 40 which rotatably and revolvably holds the plurality of short pinion gears 38a and the plurality of long pinion gears 38b and which is supported by the transmission case 22 via the one-way clutch F1. The output shaft 27 of the automatic transmission 25 is connected to drive wheels DW via a gear mechanism 28 and the differential mechanism 29.

The clutch C1 is a hydraulic clutch (friction engagement element) that has a hydraulic servo structured from a plurality of friction plates and mating plates, an oil chamber supplied with hydraulic oil, and so forth, and that is capable of fastening and unfastening the planetary carrier 34 of the single-pinion type planetary gear mechanism 30 and the sun gear 36a of the Ravigneaux type planetary gear mechanism 35 to and from each other. The clutch C2 is a hydraulic clutch that has a hydraulic servo structured from a plurality of friction plates and mating plates, an oil chamber supplied with hydraulic oil, and so forth, and that is capable of fastening and unfastening the input shaft 26 and the planetary carrier 40 of the Ravigneaux type planetary gear mechanism 35 to and from each other. The clutch C3 is a hydraulic clutch that has a hydraulic servo structured from a plurality of friction plates and mating plates, an oil chamber supplied with hydraulic oil, and so forth, and that is capable of fastening and unfastening the planetary carrier 34 of the single-pinion type planetary gear mechanism 30 and the sun gear 36b of the Ravigneaux type planetary gear mechanism 35 to and from each other.

The brake B1 is a hydraulic brake that has a hydraulic servo structured from a plurality of friction plates and mating plates, an oil chamber supplied with hydraulic oil, and so forth, and that is capable of fixing and unfixing the sun gear 36b of the Ravigneaux type planetary gear mechanism 35 to and from the transmission case 22. The brake B2 is a hydraulic brake that has a hydraulic servo structured from a plurality of friction plates and mating plates, an oil chamber supplied with hydraulic oil, and so forth, and that is capable of fixing and unfixing the planetary carrier 40 of the Ravigneaux type planetary gear mechanism 35 to and from the transmission case 22. The clutches C1 to C3 and the brakes B1 and B2 operate with hydraulic oil supplied thereto and discharged therefrom by the hydraulic control device. FIG. 3 is an operation table illustrating the relationship between each shift speed of the automatic transmission 25 and operating states of the clutches C1 to C3 and the brakes B1 and B2. The automatic transmission 25 provides first to sixth forward speeds and one reverse speed when the clutches C1 to C3 and the brakes B1 and B2 are brought into the respective states illustrated in the operation table of FIG. 3.

Figure 4:
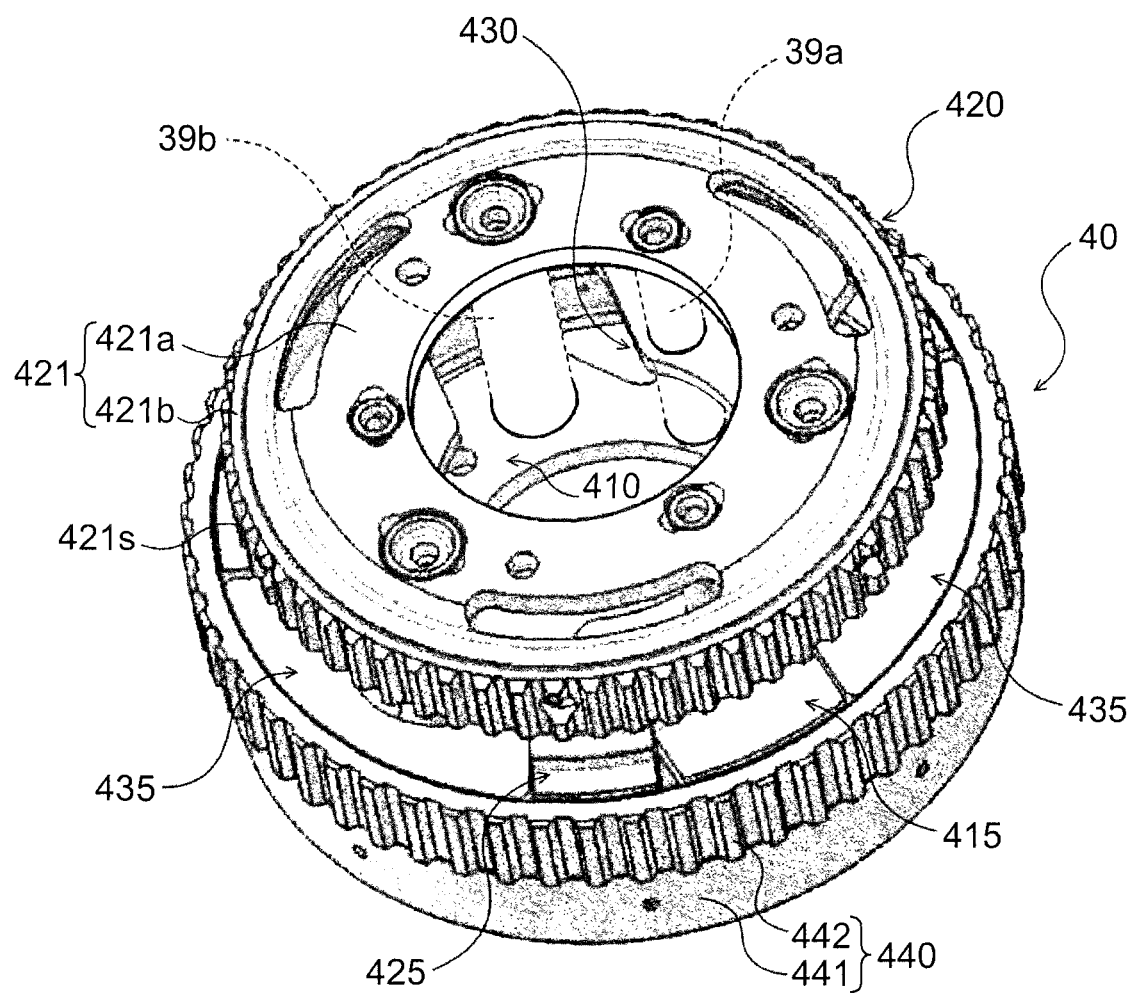
FIG. 4 is a perspective view illustrating the planetary carrier 40.
Figure 5:
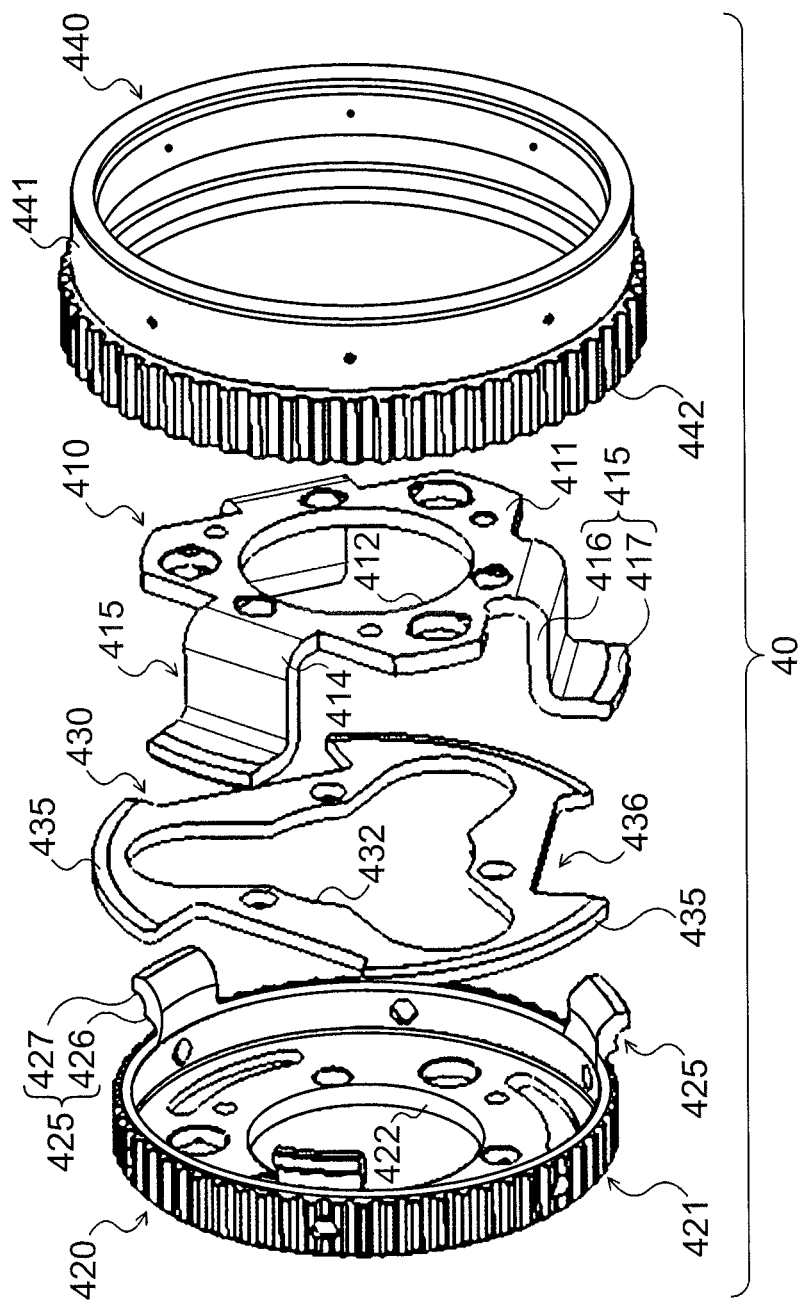
FIG. 5 is an exploded perspective view of the planetary carrier 40.
Figure 6:
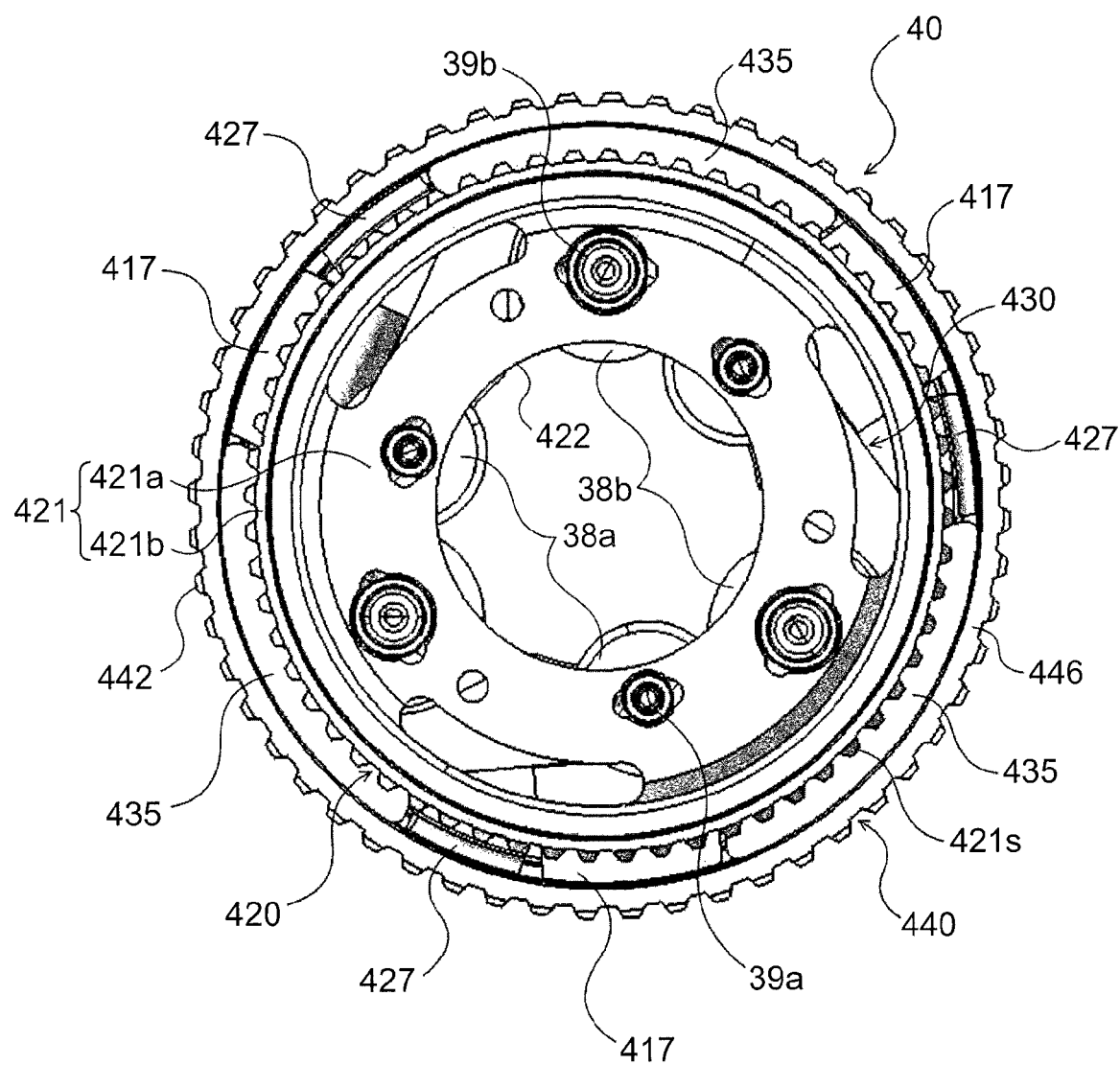
FIG. 6 is a front view illustrating the planetary carrier 40.
Figure 7:
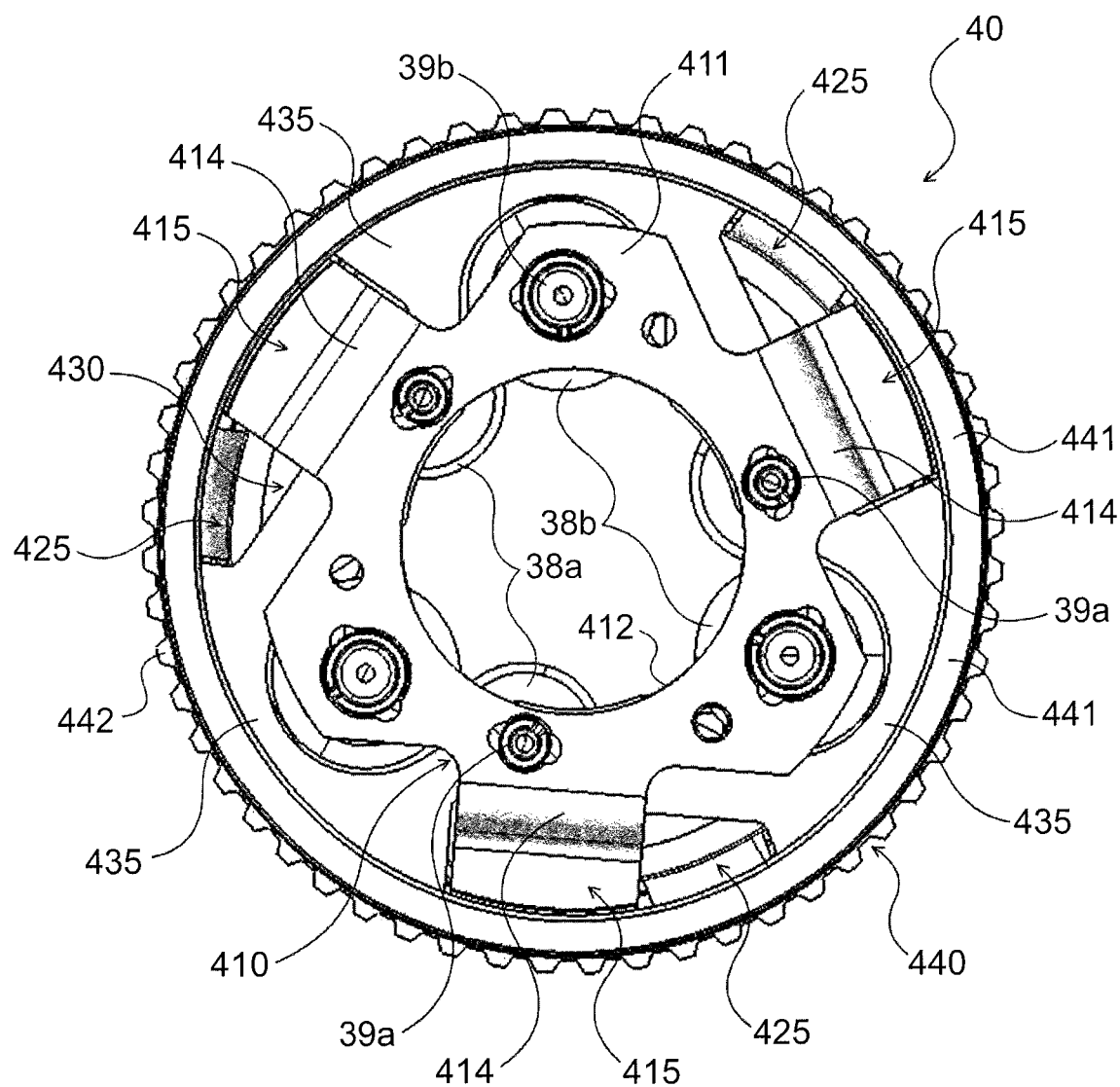
FIG. 7 is a back view illustrating the planetary carrier 40.

FIG. 4 is a perspective view illustrating the planetary carrier 40 of the Ravigneaux type planetary gear mechanism 35 included in the automatic transmission 25. FIG. 5 is an exploded perspective view of the planetary carrier 40. FIG. 6 is a front view illustrating the planetary carrier 40. FIG. 7 is a back view illustrating the planetary carrier 40. As illustrated in the drawings, the planetary carrier 40, which rotatably supports the plurality of short pinion gears 38a and the plurality of long pinion gears 38b, includes a first carrier member 410, a second carrier member 420, a center plate 430, and an annular member 440.

Figure 8:
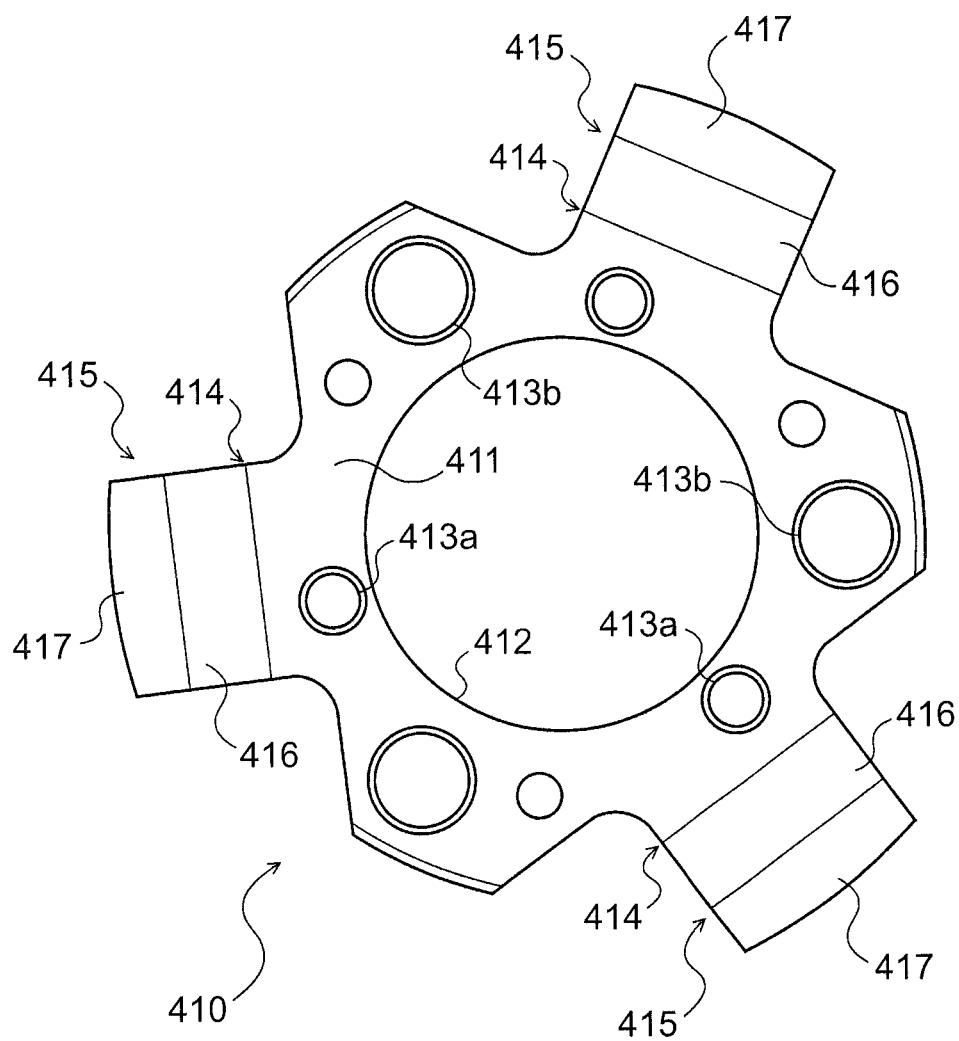
FIG. 8 is a plan view illustrating a first carrier member 410.

The first carrier member 410 is formed from a metal in the embodiment, and has, as illustrated in FIGS. 5, 8, and so forth, a first shaft support portion 411 that has a flat plate shape and that supports respective first ends of a plurality of (in the embodiment, three) short pinion shafts (second pinion shafts) 39a (see FIGS. 4, 6, and 7) inserted through the short pinion gears 38a and respective first ends of a plurality of (in the embodiment, three) long pinion shafts (first pinion shafts) 39b (see FIGS. 4, 6, and 7) inserted through the long pinion gears 38b, and a plurality of (in the embodiment, three at intervals of 120°) first leg portions 415 extended from the first shaft support portion 411 at intervals in the circumferential direction.

As illustrated in FIG. 8 etc., a center hole (circular hole) 412 for insertion of the input shaft 26 of the automatic transmission 25 and the sun gears 36a and 36b is formed in the center of the first shaft support portion 411, and a plurality of (in the embodiment, three each at intervals of 120°) shaft holes 413a for insertion of the short pinion shafts 39a and a plurality of (in the embodiment, three each at intervals of 120°) shaft holes 413b for insertion of the long pinion shafts 39b are alternately formed around the center hole 412. As illustrated in FIG. 5 etc., meanwhile, each of the first leg portions 415 includes a basal portion 416 extended in the axial direction of the first carrier member 410 (center hole 412), that is, in the axial direction of the input shaft 26 and the pinion shafts 39a and 39b, from the outer periphery of the first shaft support portion 411 via a straight bent portion 414, and a free end portion 417 extended outward in the radial direction of the input shaft 26 and the pinion shafts 39a and 39b from the basal portion 416. As illustrated in FIGS. 4, 6, and so forth, further, the distal end (outer periphery) of the free end portion 417 of each of the first leg portions 415 is formed in an arcuate shape having a radius of curvature determined in advance.

Figure 9:
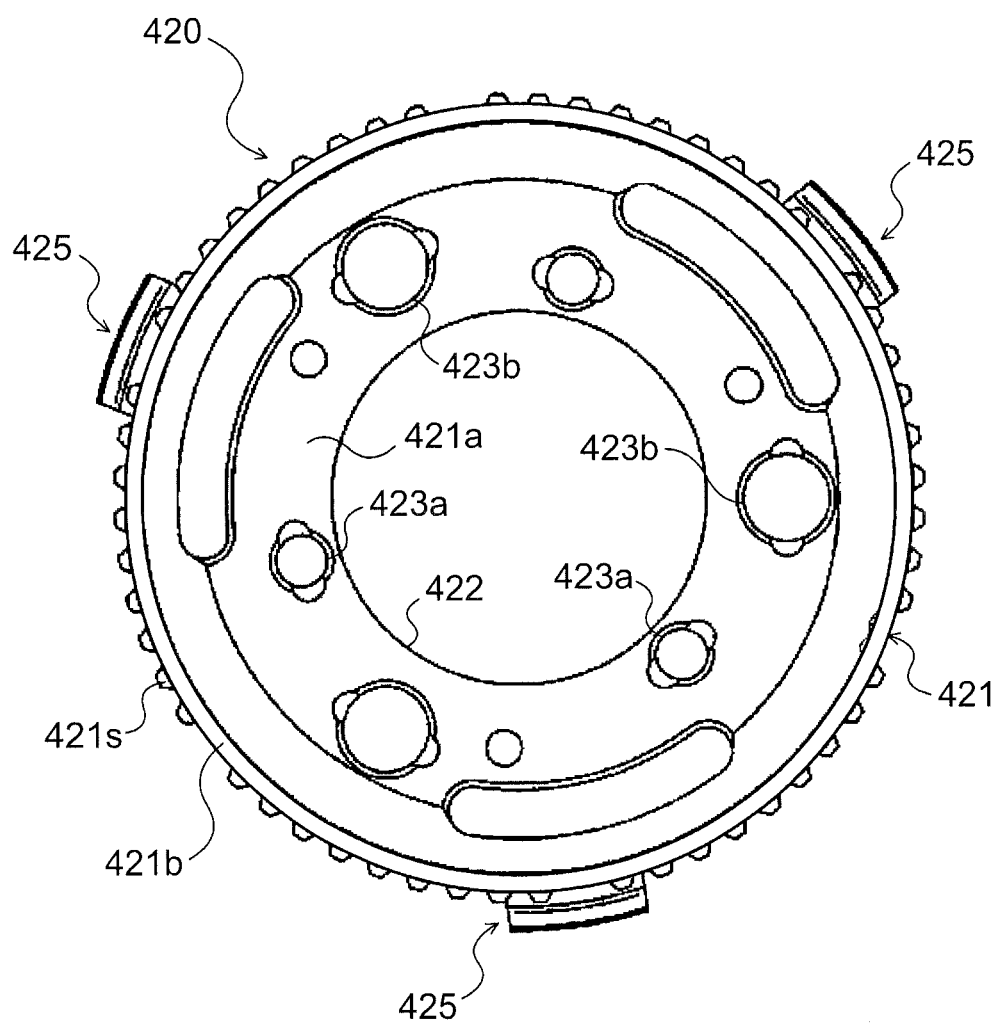
FIG. 9 is a plan view illustrating a second carrier member 420.

The second carrier member 420 is formed from a metal in the embodiment, and has, as illustrated in FIGS. 5, 9, and so forth, a second shaft support portion 421 that supports respective second ends of the plurality of short pinion shafts 39a and respective second ends of the plurality of long pinion shafts 39b, and a plurality of (in the embodiment, three at intervals of 120°) second leg portions 425 extended from the second shaft support portion 421 at intervals in the circumferential direction. The second shaft support portion 421 is formed in the shape of a bottomed tube with a low height, and includes, as illustrated in FIG. 9 etc., a base portion 421a in a flat plate shape and a tubular portion 421b in a cylindrical shape extended from the outer periphery of the base portion.

As illustrated in FIG. 9 etc., a center hole (circular hole) 422 for insertion of the input shaft 26 of the automatic transmission 25 is formed in the center of the base portion 421a of the second shaft support portion 421, and a plurality of (in the embodiment, three each at intervals of 120°) shaft holes 423a for insertion of the short pinion shafts 39a and shaft holes 423b for insertion of the long pinion shafts 39b are alternately formed around the center hole 422. The second shaft support portion 421 also functions as a clutch hub of the clutch C2, and splines 421s to be fitted with friction plates FP (see FIG. 2) structuring the clutch C2 are formed on the outer periphery of the tubular portion 421b. As illustrated in FIG. 5 etc., further, each of the second leg portions 425 includes a basal portion 426 extended in the axial direction of the second carrier member 420 (center hole 422) from the outer periphery of the second shaft support portion 421, that is, from the tubular portion 421b, and a free end portion 427 extended outward in the radial direction from the basal portion 426. As illustrated in FIGS. 4, 6, and so forth, the outer periphery of the free end portion 427 of each of the second leg portions 425 is formed in an arcuate shape having the same radius of curvature as that of the distal end (outer periphery) of the free end portion 417 of each of the first leg portions 415.

Figure 10:
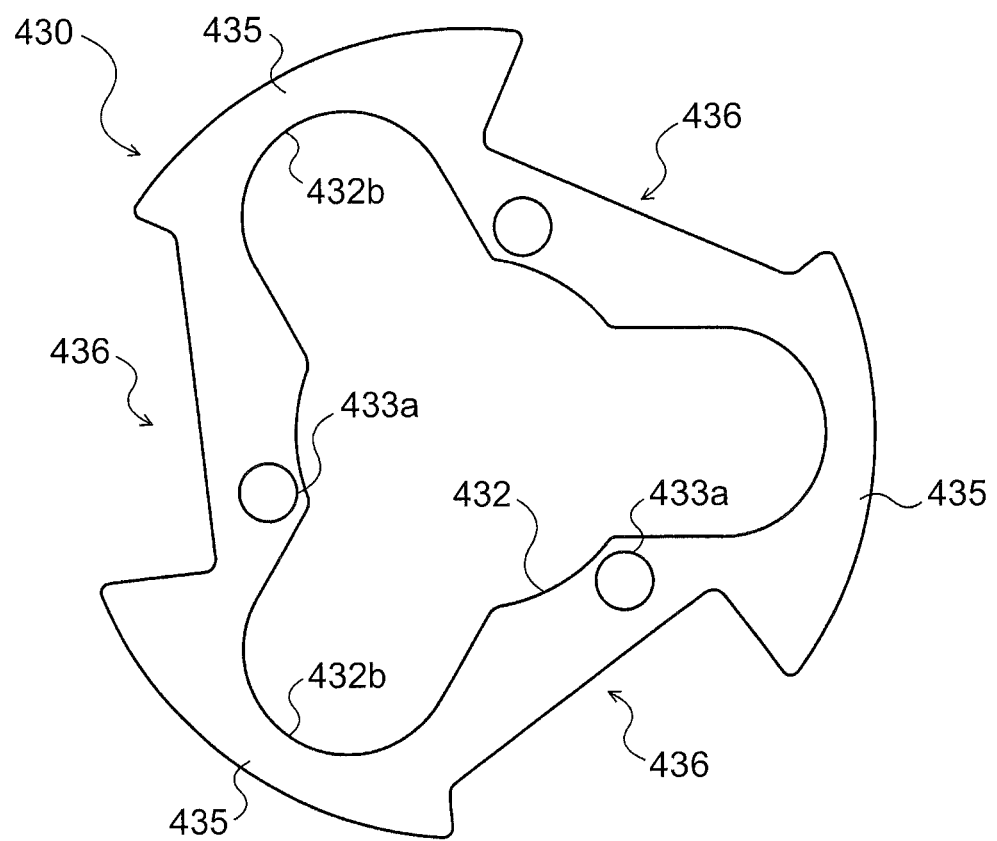
FIG. 10 is a plan view illustrating a center plate 430.
Figure 11:
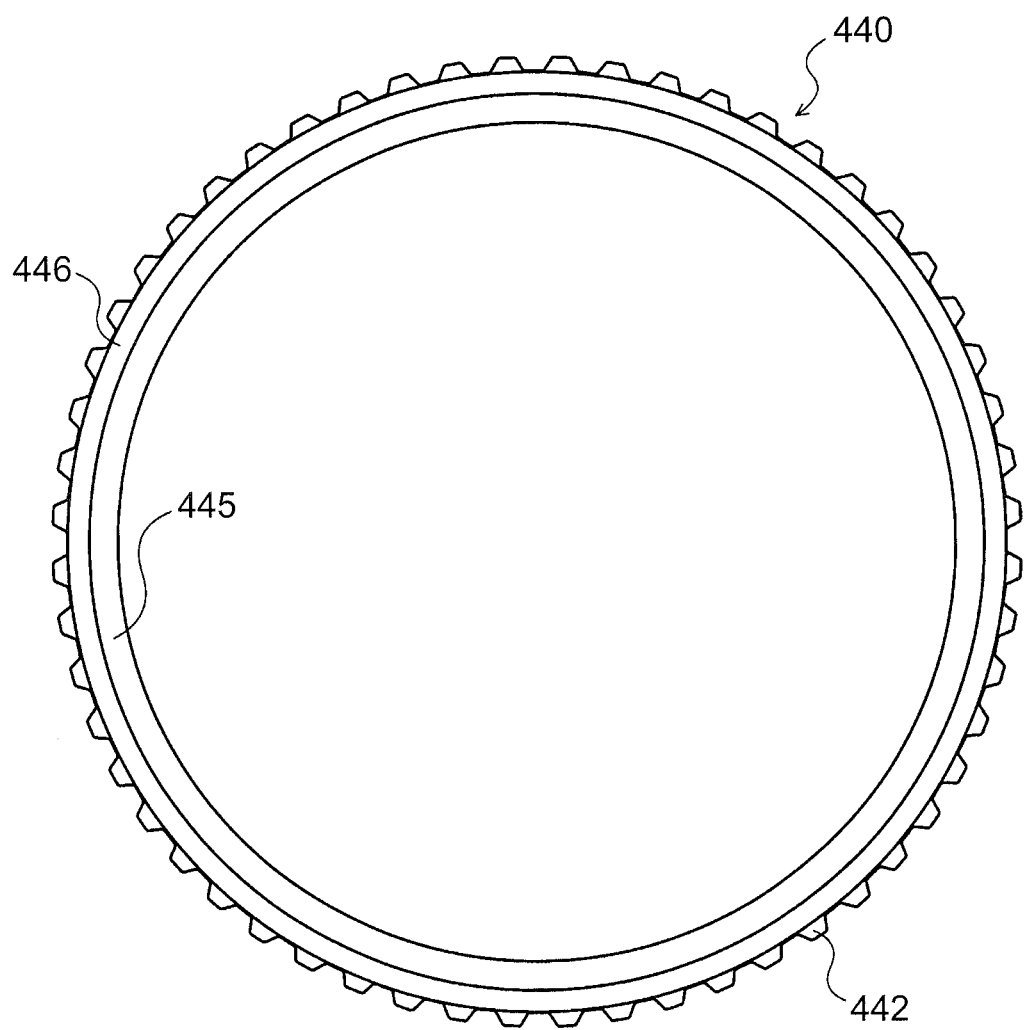
FIG. 11 is a plan view illustrating an annular member 440.

In the embodiment, the center plate 430 is formed by pressing a metal plate. As illustrated in FIGS. 5, 10, and so forth, the center plate 430 has a center hole 432 for insertion of the input shaft 26 of the automatic transmission 25 and the sun gear 36a, a plurality of (in the embodiment, three at intervals of 120°) long pinion gear insertion portions (first pinion shaft insertion portions) 432b in a notch shape and for insertion of the long pinion gears 38b, the long pinion gear insertion portions 432b being continuous with the center hole 432, and shaft holes (second pinion shaft insertion portions) 433a for insertion of the short pinion shafts 39a. The long pinion gear insertion portions 432b may be through holes, and notches may be formed in the center plate 430 in place of the shaft holes 433b to serve as the second pinion shaft insertion portions.

In addition, the center plate 430 has a plurality of (in the embodiment, three at intervals of 120°) abutment portions 435 formed at intervals in the circumferential direction, and a plurality of (in the embodiment, three at intervals of 120°) notch portions 436 formed between the abutment portions 435 which are adjacent to each other. In the embodiment, the width of each of the notch portions 436 is deteanined such that one free end portion 417 of the first leg portion 415 of the first carrier member 410 and one free end portion 427 of the second leg portion 425 of the second carrier member 420 are accommodated preferably without any space between the abutment portions 435 which are adjacent to each other. As illustrated in FIGS. 4, 6, and so forth, the outer periphery of each of the abutment portions 435 is formed in an arcuate shape having the same radius of curvature as that of the outer periphery of the free end portion 417 of each of the first leg portions 415 and the outer periphery of the free end portion 427 of each of the second leg portions 425.

The annular member 440 is formed by forging in the embodiment, and configured to function both as an inner race of the one-way clutch F1 of the automatic transmission 25 and a brake hub of the brake B1 of the automatic transmission 25. That is, the annular member 440 has a cylindrical inner lace portion 441 provided on one end side, and a brake hub portion 442 provided on the other end side and with splines formed on the outer periphery thereof, and the friction plates FP (see FIG. 2) structuring the brake B1 are fitted with the brake hub portion 442. In addition, an annular abutment end surface (one-end surface) 445 and an annular projection portion 446 that projects in the axial direction to surround the abutment end surface 445 are formed at an end portion of the annular member 440 on the brake hub portion 442 side. As illustrated in FIGS. 4, 6, and so forth, the radius of curvature of the inner peripheral surface of the annular projection portion 446 is determined to be slightly larger than (generally the same as) the radius of curvature of the outer periphery of the free end portion 417 of each of the first leg portions 415, the free end portion 427 of each of the second leg portions 425, and each of the abutment portions 435 of the center plate 430.

Next, a procedure for manufacturing the planetary carrier 40 discussed above will be described with reference to FIGS. 12 and 13.

Figure 12:
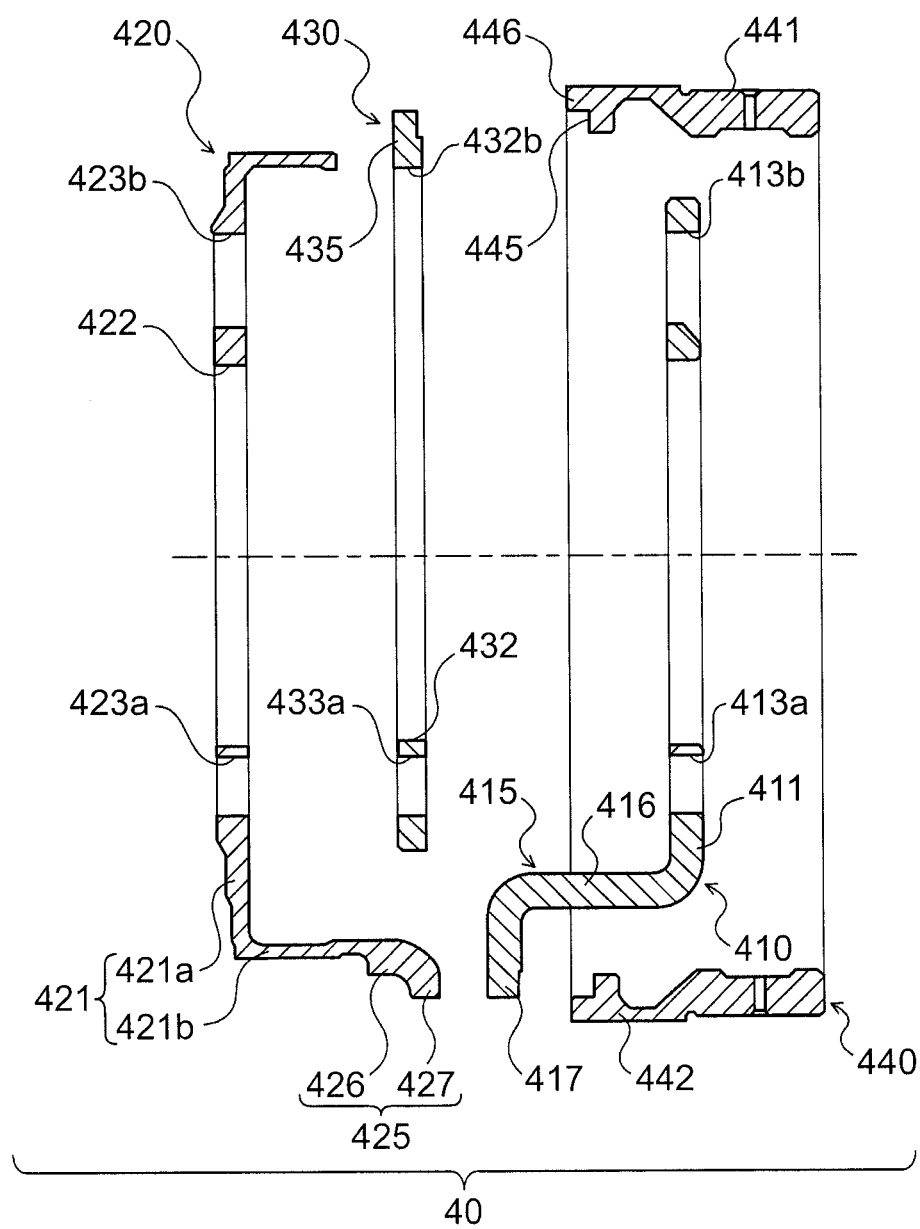
FIG. 12 is a sectional view illustrating a procedure for manufacturing the planetary carrier 40.

In manufacturing the planetary carrier 40, the first carrier member 410, the second carrier member 420, the center plate 430, and the annular member 440 configured as discussed above are prepared. Then, as illustrated in FIG. 12, the first shaft support portion 411 of the first carrier member 410 and the basal portion 416 of each of the first leg portions 415 are inserted into the annular member 440 from an opening on the brake hub portion 442 side, and the free end portion 417 of each of the first leg portions 415 is brought into abutment with the abutment end surface 445 of the annular member 440. In this event, since the annular projection portion 446 with an inner peripheral surface having generally the same radius of curvature as that of the distal end (outer periphery) of the free end portion 417 of each of the first leg portions 415 is formed at the outer periphery of the abutment end surface 445 of the annular member 440, the first carrier member 410 can be centered with respect to the annular member 440 easily and accurately by just disposing the free end portion 417 of each of the first leg portions 415 of the first carrier member 410 in the annular projection portion 446 so as to abut against the abutment end surface 445.

Then, the center plate 430 is disposed in the annular projection portion 446 such that each of the abutment portions 435 abuts against the abutment end surface 445 of the annular member 440 at a position that is different in the circumferential direction from the position of the free end portion 417 of each of the first leg portions 415. Also in this event, since the outer periphery of each of the abutment portions 435 of the center plate 430 has generally the same radius of curvature as that of the inner peripheral surface of the annular projection portion 446, the center plate 430 can be centered with respect to the annular member 440 and the first carrier member 410 easily and accurately by just disposing the center plate 430 in the annular projection portion 446 as discussed above. Further, the free end portion 427 of each of the second leg portions 425 of the second carrier member 420 is disposed in the annular projection portion 446 so as to abut against the abutment end surface 445 of the annular member 440 between the first leg portions 415 and the abutment portions 435 of the center plate 430. Also in this event, since the outer periphery of the free end portion 427 of each of the second leg portions 425 has generally the same radius of curvature as that of the inner peripheral surface of the annular projection portion 446, the second carrier member 420 can be centered with respect to the annular member 440, the first carrier member 410, and the center plate 430 easily and accurately by just disposing the free end portions 427 of the second leg portions 425 in the annular projection portion 446 as discussed above.

Figure 13:
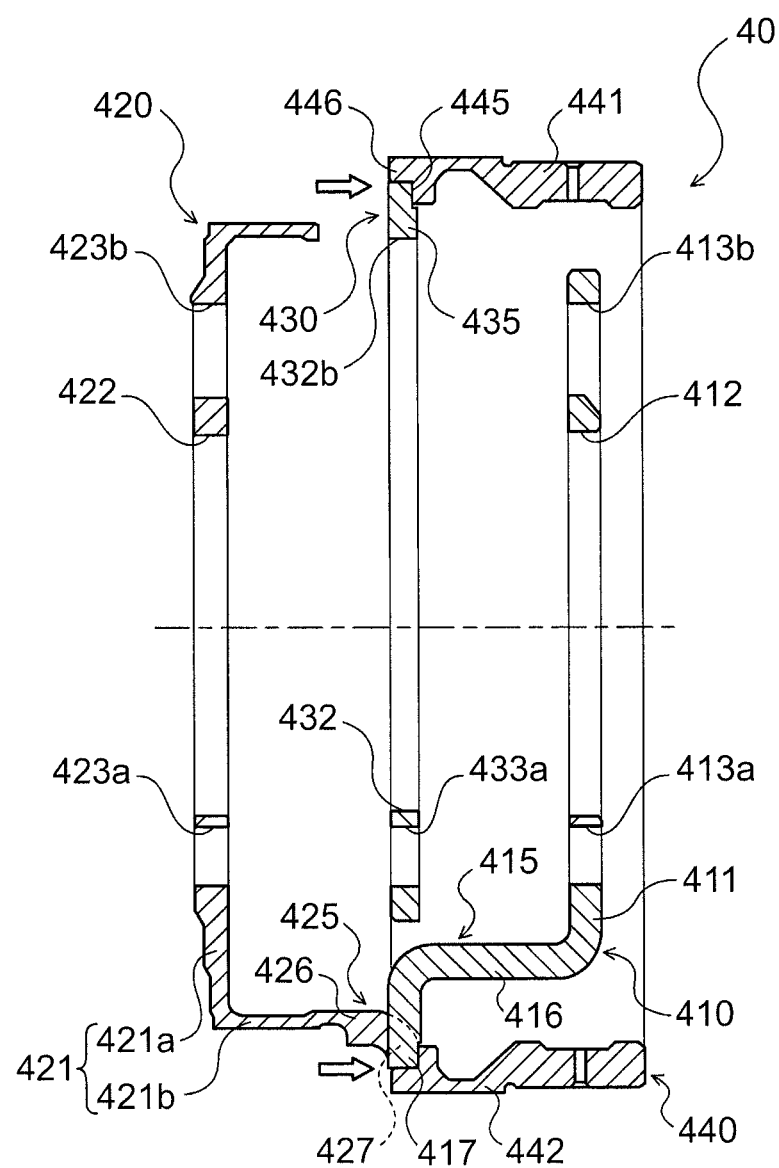
FIG. 13 is a sectional view illustrating a procedure for manufacturing the planetary carrier 40.

When the first carrier member 410, the center plate 430, and the second carrier member 420 are assembled to the annular member 440 in this way as illustrated in FIG. 13, welding (for example, electron beam welding) is performed along the inner peripheral surface of the annular projection portion 446 (see the hollow arrows in FIG. 13) to fix the first leg portions 415, the second leg portions 425, and the abutment portions 435 to the annular member 440 (the inner peripheral surface of the annular projection portion 446). This allows the first carrier member 410, the center plate 430, and the second carrier member 420 to be collectively welded to the annular member 440 by performing substantially one welding along a circumference around the axis of the annular member 440 etc. from one direction, that is, from the second carrier member 420 side (from the left side in FIG. 13), thereby completing the planetary carrier 40. In addition, since the free end portion 417 of each of the first leg portions 415, the free end portion 427 of each of the second leg portions 425, and the distal end (outer periphery) of each of the abutment portions 435 are formed in an arcuate shape, the first and second leg portions 415 and 425 and the abutment portions 435 can be welded to the annular member 440 more strongly by performing welding along the inner peripheral surface of the annular projection portion 446.

In the planetary gear described in Patent Document 1 described above, meanwhile, an end portion of a peripheral edge portion of a second carrier plate is inserted into a long hole portion of a center plate, and directly fixed to the center plate by welding. In the case where such a technique is adopted, however, the center plate may be warped when a member that is fused during welding is cooled and solidified, which makes it difficult to keep the center plate and a bottom plate portion of the second carrier plate in parallel with each other. By bringing both the first and second leg portions 415 and 425 and the plurality of abutment portions 435 of the center plate 430 into abutment with the abutment end surface 445, that is, an identical end surface, of the annular member 440 and performing welding along the abutment end surface 445, that is, a circumference around the axis of the annular member 440 etc., in contrast, all of the first shaft support portion 411, the second shaft support portion 412, and the center plate 430 can be accurately disposed in parallel with each other.

The short pinion gears 38a and the long pinion gears 38b are disposed inside the planetary carrier 40 manufactured as discussed above via the center hole 412 formed in the first shaft support portion 411 of the first carrier member 410 or the center hole 422 formed in the second shaft support portion 421 of the second carrier member 420. The short pinion shaft 39a is inserted through each short pinion gear 38a and each shaft hole 413a of the first shaft support portion 411, each shaft hole 433a of the center plate 430, and each shaft hole 423a of the second shaft support portion 421, and both ends of each short pinion shaft 39a are caulked, for example, so that each short pinion gear 38a is rotatably supported by the planetary carrier 40. Further, the long pinion shaft 39b is inserted through each long pinion gear 38b and each shaft hole 413b of the first shaft support portion 411 and each shaft hole 423b of the second shaft support portion 421, and both ends of each long pinion shaft 39b are caulked, for example, so that each long pinion gear 38b is rotatably supported by the planetary carrier 40.

Here, in the planetary carrier 40 according to the embodiment, as illustrated in FIGS. 2 and 4, the short pinion shafts 39a inserted through the short pinion gears 38a have about the same axial length as that of the long pinion shafts 39b inserted through the long pinion gears 38b. Respective ends of each of the short pinion shafts 39a are supported by the first and second carrier members 410 and 420, and a portion of each of the short pinion shafts 39a around the middle in the axial direction (on one end side) is supported by the center plate 430. This enables each of the short pinion shafts 39a to be strongly supported by the first and second carrier members 410 and 420 and the center plate 430 compared to a case where respective ends of each of the short pinion shafts 39a are supported by the center plate 430 and the second carrier member 420.

As described above, the planetary carrier 40 structuring the Ravigneaux type planetary gear mechanism 35 of the automatic transmission 25 rotatably supports the plurality of short pinion gears 38a and the plurality of long pinion gears 38b which are longer than the short pinion gears 38a, and includes the first carrier member 410, the second carrier member 420, the center plate 430, and the annular member 440. The first carrier member 410 has the first shaft support portion 411 which supports the respective first ends of the plurality of short pinion shafts 39a inserted through the short pinion gears 38a and the respective first ends of the plurality of long pinion shafts 39b inserted through the long pinion gears 38b, and the plurality of first leg portions 415 extended from the first shaft support portion 411 at intervals in the circumferential direction. In addition, the second carrier member 420 has the second shaft support portion 421 which supports the respective second ends of the plurality of short pinion shafts 39a and the respective second ends of the plurality of long pinion shafts 39b, and the plurality of second leg portions 425 extended from the second shaft support portion 421 at intervals in the circumferential direction. Further, the center plate 430 has the plurality of abutment portions 435 formed at intervals in the circumferential direction, and supports respective portions of the plurality of short pinion shafts 39a around the middle (on one end side). The annular member 440 has the abutment end surface (one end surface) 445 with which the plurality of first leg portions 415 of the first carrier member 410, the plurality of second leg portions 425 of the second carrier member 420, and the plurality of abutment portions 435 of the center plate 430 are brought into abutment, and the annular projection portion 446 which surrounds the abutment end surface 445 and which has an inner peripheral surface that serves as the welded portion to which the plurality of first leg portions 415, the plurality of second leg portions 425, and the plurality of abutment portions 435 are to be welded.

In manufacturing the planetary carrier 40, the plurality of first leg portions 415 (free end portions 417) of the first carrier member 410, the plurality of second leg portions 425 (free end portions 427) of the second carrier member 420, and the plurality of abutment portions 435 of the center plate 430 are brought into abutment with the abutment end surface 445 of the annular member 440 at different positions in the circumferential direction, and welded to the annular member 440, that is, the inner peripheral surface of the annular projection portion 446, at different positions in the circumferential direction. By bringing both the first and second leg portions 415 and 425 and the plurality of abutment portions 435 of the center plate 430 into abutment with the abutment end surface 445, that is, an identical end surface, of the annular member 440 and performing welding along the abutment end surface 445, that is, a circumference around the axis of the annular member 440 etc. in this way, both the first and second carrier members 410 and 420 and the center plate 430 can be collectively fixed to the annular member 440 easily without directly welding the first leg portions 415 and the second leg portions 425 to the center plate 430, and all of the first shaft support portion 411, the second shaft support portion 412, and the center plate 430 can be accurately disposed in parallel with each other. Consequently, it is possible to easily and accurately manufacture the planetary carrier 40 to be applied to the Ravigneaux type planetary gear mechanism 35, and to reduce the cost of manufacture by reducing the number of welding steps.

In the embodiment described above, in addition, the annular projection portion 446 which projects in the axial direction to surround the abutment end surface 445 is formed on the annular member 440. This allows the first and second carrier members 410 and 420 and the center plate 430 to be centered with respect to the annular member 440 by the annular projection portion 446, which makes it possible to improve the assembly accuracy of the planetary carrier 40. With the inner peripheral surface of the annular projection portion 446 serving as a welded portion, the first leg portions 415, the second leg portions 425, and the abutment portions 435 can be easily fixed to the annular member 440 by performing welding from one direction as discussed above. It should be noted, however, that the annular member 440 may not be provided with the annular projection portion 446, in which case the first leg portions 415, the second leg portions 425, and the abutment portions 435 may be welded to the abutment end surface 445 by performing welding from the outer peripheral side with the abutment end surface 445 serving as the welded portion.

In the embodiment described above, further, the free end portions 417, 427 of the first and second leg portions 415 and 425 and the distal ends (outer periphery) of the abutment portions 435 of the center plate 430 are formed in an arcuate shape. This makes it possible to improve the accuracy in centering the first and second carrier members 410 and 420 and the center plate 430 achieved by the annular projection portion 446, and to weld the first and second leg portions 415 and 425 and the abutment portions 435 to the annular member 440 more strongly by performing welding along the inner peripheral surface of the annular projection portion 446.

In the embodiment described above, in addition, the free end portions 417 of the plurality of first leg portions 415 abut against the abutment end surface 445 of the annular member 440, at least a part of the first carrier member 410 (the basal portions 416 of the first leg portions 415) is disposed on the inner peripheral side of the annular member 440, and the second carrier member 420 is disposed such that the plurality of second leg portions 425 abut against the abutment end surface 445 of the annular member 440 and the second shaft support portion 421 faces the first shaft support portion 411 of the first carrier member 410. This allows the first leg portions 415 to abut against the abutment end surface 445 by bringing the first carrier member 410 closer to the annular member 440 from one side (from the brake hub portion 442 side), and allows the second leg portions 425 to abut against the abutment end surface 445 by bringing the second carrier member 420 closer to the annular member 440 from the one side, which makes it possible to easily assemble the first and second carrier members 410 and 420 to the annular member 440.

Further, each of the first leg portions 415 of the first carrier member 410 includes the basal portion 416 extended in the axial direction from the first shaft support portion 411, and the free end portion 417 extended outward in the radial direction from the basal portion 416. This makes it possible to easily structure the first carrier member 410, at least a part of which is disposed in the annular member 440 such that the free end portions 417 of the plurality of first leg portions 415 abut against the abutment end surface 445 of the annular member 440. In the embodiment described above, the basal portions 416 of the first leg portions 415 are extended from the first shaft support portion 411 via the straight bent portions 414. This makes it possible to improve the strength of the first leg portions 415 with stress concentration suppressed compared to a case where the basal portions 416 of the first leg portions 415 are extended from the first shaft support portion 411 via curved (arcuate) bent portions. In addition, the second leg portions 425 of the second carrier member 420 may be extended from the second shaft support portion 421 via straight bent portions, which makes it possible to improve the strength of the second leg portions 425.

In the planetary carrier 40 discussed above, in addition, the respective first ends of the plurality of short pinion shafts 39a are supported by the first shaft support portion 411 of the first carrier member 410, the respective second ends of the plurality of short pinion shafts 39a are supported by the second shaft support portion 421 of the second carrier member 420, and the respective portions of the plurality of short pinion shafts 39a around the middle (on one end side) are supported by the center plate 430. With respective ends of the plurality of short pinion shafts 39a supported by the first and second carrier members 410 and 420 in this way, the short pinion shafts 39a can be strongly supported by the first and second carrier members 410 and 420 and the center plate 430. It should be noted, however, that the short pinion shafts 39a inserted through the short pinion gears 38a which are short may be shorter than the long pinion shafts 39b inserted through the long pinion gears 38b, in which case respective ends of the short pinion shafts 39a may be supported by the center plate 430 and the second carrier member 420 (or the first carrier member 410). This enables the planetary carrier 40 to become more compact.

Figure 14:
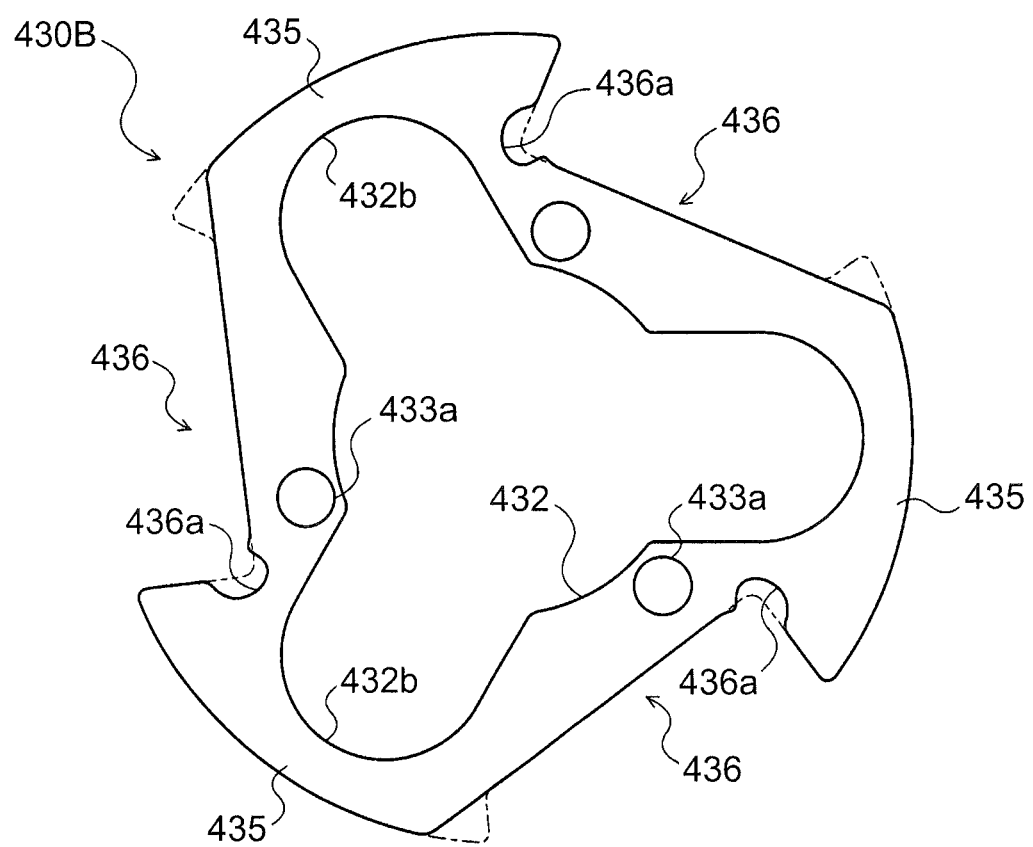
FIG. 14 is a plan view illustrating a center plate 430B according to a modification.

Although the first and second carrier members 410 and 420 discussed above may be formed by forging, the first and second carrier members 410 and 420 may be formed by pressing a metal plate for a cost reduction. In the case where the first and second carrier members 410 and 420 are formed by pressing in this way, the free end portion 417 of each of the first leg portions 415 and the free end portion 427 of each of the second leg portions 425 may be swelled in the width direction by the pressing, and thus a center plate 430B illustrated in FIG. 14 is preferably used. The center plate 430B illustrated in FIG. 14 is obtained by cutting away one end (see the dash-and-dot lines in FIG. 14) of each of the abutment portions 435 of the center plate 430 illustrated in FIG. 10 in order to suppress interference with the free end portion 427 of each of the second leg portions 425, and forming an arcuate escape portion 436a in one corner portion (see the dash-double-dot lines in FIG. 14) of each of the notch portions 436 of the center plate 430 illustrated in FIG. 10 in order to suppress interference with the free end portion 417 of each of the first leg portions 415 and suppress stress concentration. Use of such a center plate 430B makes it possible to suppress interference between each of the abutment portions 435 of the center plate 430B and the free end portions 417 and 427 of the first and second leg portions 415 and 425 even if the first and second carrier members 410 and 420 are formed by pressing. In addition, the planetary carrier 40 is applied to the Ravigneaux type planetary gear mechanism 35 in the embodiment described above. However, the object of application of the planetary carrier 40 is not limited thereto. That is, the planetary carrier 40 discussed above may be applied to a double-pinion type planetary gear mechanism having two types of, that is, long and short, pinion gears.

Figure 15:
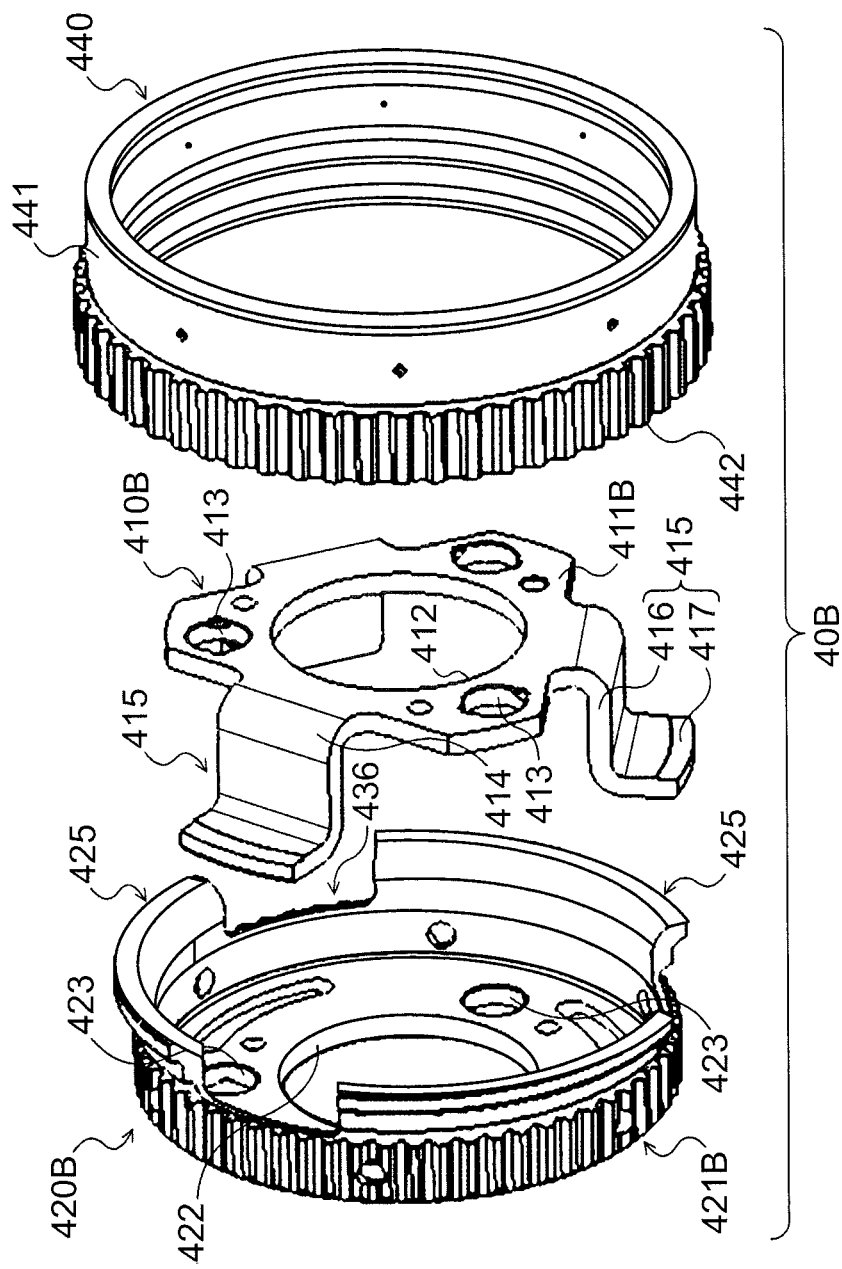
FIG. 15 is an exploded perspective view of a planetary carrier 40B according to a modification.
Figure 16:
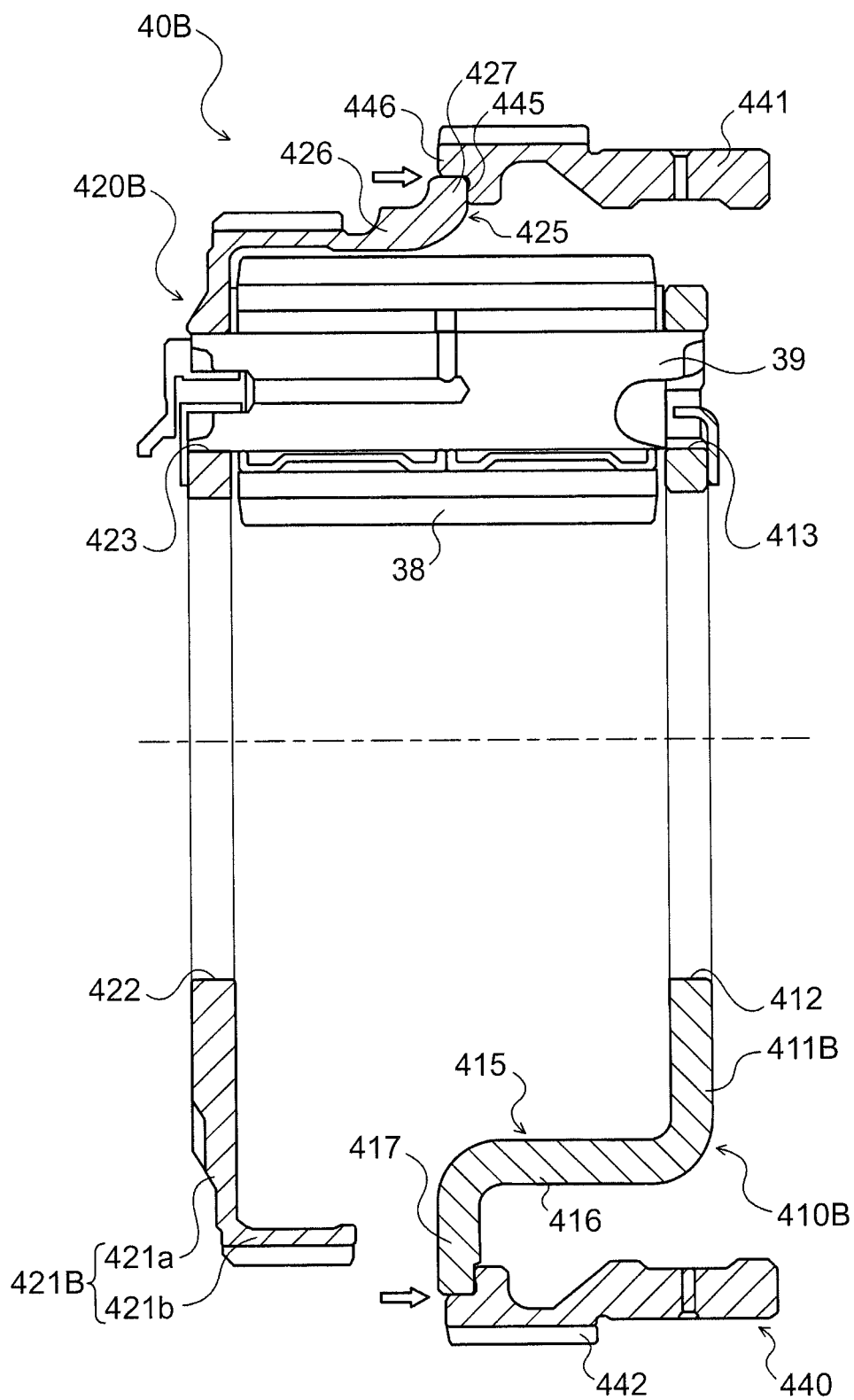
FIG. 16 is a sectional view illustrating the planetary carrier 40B.

FIG. 15 is an exploded perspective view of a planetary carrier 40B according to a modification. FIG. 16 is a sectional view illustrating the planetary carrier 40B. The planetary carrier 40B illustrated in the drawings is applied to a single-pinion type planetary gear mechanism (not illustrated), and includes a first carrier member 410B, a second carrier member 420B, and the annular member 440. Elements that are identical to the elements described in relation to the planetary carrier 40 discussed above are given the same reference numerals to omit redundant descriptions.

The first carrier member 410B is formed by pressing a metal plate, for example, and has a first shaft support portion 411B that has a flat plate shape and that supports respective first ends of a plurality of (in the embodiment, three) pinion shafts 39 inserted through pinion gears 38, and a plurality of (in the embodiment, three at intervals of 120°) first leg portions 415 extended from the first shaft support portion 411B at intervals in the circumferential direction. A center hole (circular hole) 412 for insertion of the input shaft of the automatic transmission etc. is formed in the center of the first shaft support portion 411B. A plurality of (in the embodiment, three at intervals of 120°) shaft holes 413 for insertion of the pinion shafts 39 are formed around the center hole 412. Each of the first leg portions 415 includes a basal portion 416 extended in the axial direction of the first carrier member 410B (center hole 412) from the outer periphery of the first shaft support portion 411B, and a free end portion 417 extended outward in the radial direction from the basal portion 416. Further, the radius of curvature of the distal end (outer periphery) of each of the free end portions 417 is determined to be slightly smaller than (generally the same as) the radius of curvature of the inner peripheral surface of the annular projection portion 446.

The second carrier member 420B is formed by pressing a metal plate, for example, and has a second shaft support portion 421B that supports respective second ends of the plurality of pinion shafts 39, and a plurality of (in the embodiment, three at intervals of 120°) second leg portions 425 extended from the second shaft support portion 421B at intervals in the circumferential direction. The second shaft support portion 421B is foamed in the shape of a bottomed tube with a low height, and includes, as illustrated in FIG. 16, a base portion 421a in a plate shape and a tubular portion 421b in a cylindrical shape extended from the outer periphery of the base portion. A center hole (circular hole) 422 for insertion of the input shaft of the automatic transmission etc. is formed in the center of the base portion 421a of the second shaft support portion 421B. A plurality of (in the embodiment, three at intervals of 120°) shaft holes 423 for insertion of the pinion shafts 39 are formed around the center hole 422.

Each of the second leg portions 425 includes a basal portion 426 extended from the outer periphery, that is, the tubular portion 421b, of the second shaft support portion 421B in the axial direction of the second carrier member 420B (center hole 422), and a free end portion 427 extended outward in the radial direction from the basal portion 426. The radius of curvature of the outer periphery of each of the free end portions 427 is determined to be the same as the distal end (outer periphery) of the free end portion 417 of each of the first leg portions 415, and to be slightly smaller than (generally the same as) the radius of curvature of the inner peripheral surface of the annular projection portion 446. The interval of the second leg portions 425 which are adjacent to each other (width of the notch portions) is determined such that one free end portion 417 of the first leg portion 415 of the first carrier member 410B is accommodated preferably without any space between the free end portions 427 which are adjacent to each other.

In manufacturing the planetary carrier 40B, as illustrated in FIG. 16, the plurality of first leg portions 415 of the first carrier member 410B and the plurality of second leg portions 425 of the second carrier member 420B are brought into abutment with the abutment end surface 445 of the annular member 440 at different positions in the circumferential direction, and the first and second leg portions 415 and 425 are welded to the annular member 440 (annular projection portion 446). By bringing both the first and second leg portions 415 and 425 into abutment with the abutment end surface 445 of the annular member 440 in this way, both the first and second leg portions 415 and 425, that is, the first and second carrier members 410 and 420 can be collectively fixed to the annular member 440 easily by performing welding along the abutment end surface 445 of the annular member 440 (the inner peripheral surface of the annular projection portion 446) (see the hollow arrows in FIG. 16). This makes it possible to facilitate manufacture of the planetary carrier 40B, and to reduce the cost of manufacture by reducing the number of welding steps. Although the planetary carrier 40B illustrated in FIGS. 15 and 16 is applied to a single-pinion type planetary gear mechanism, the planetary carrier 40B which does not have a center plate may be applied to a double-pinion type planetary gear mechanism.

Here, the correspondence between the main elements of the embodiment and the modification described above and the main elements of the invention described in the "SUMMARY OF THE INVENTION" section will be described. That is, in the embodiment etc. described above, the planetary carrier 40 which rotatably supports the plurality of short pinion gears 38a and long pinion gears 38b and the planetary carrier 40b which rotatably supports the plurality of pinion gears 38 correspond to the "planetary carrier". The first carrier members 410 and 410B which have the first shaft support portion 411 or 411B and the plurality of first leg portions 415 extended from the first shaft support portion 411 or 411B at intervals in the circumferential direction correspond to the "first carrier member". The second carrier members 420 and 420B which have the second shaft support portion 421 or 421B and the plurality of second leg portions 425 extended from the second shaft support portion 421 or 421B at intervals in the circumferential direction correspond to the "second carrier member". The annular member 440 which has the abutment end surface 445 for abutment with the plurality of first leg portions 415 of the first carrier member 410 or 410B and the plurality of second leg portions 425 of the second carrier member 420 or 420B and to which the first and second leg portions 415 and 425 are to be welded corresponds to the "annular member". The center plate 430 which has the plurality of abutment portions 435 which abut against the abutment end surface 445 of the annular member 440 to be welded to the annular member 440 corresponds to the "center plate".

The correspondence between the main elements of the embodiment etc. and the main elements of the invention described in the "SUMMARY OF THE INVENTION" section does not limit the elements of the invention described in the "SUMMARY OF THE INVENTION" section, because the embodiment etc. are examples given for the purpose of specifically describing the invention described in the "SUMMARY OF THE INVENTION" section. That is, the embodiment etc. are merely specific examples of the invention described in the "SUMMARY OF THE INVENTION" section, and the invention described in the "SUMMARY OF THE INVENTION" section should be construed on the basis of the description in that section.

While a mode for carrying out the present invention has been described above by way of an embodiment, it is a matter of course that the present invention is not limited to the embodiment in any way, and that the present invention may be modified in various ways without departing from the scope and sprit of the present invention.

INDUSTRIAL APPLICABILITY

The present invention can be utilized in the industry for the manufacture of planetary carriers and planetary gear mechanisms.

The invention claimed is:

1. A planetary carrier that rotatably supports a plurality of pinion gears, characterized by comprising:
   a first carrier member that has a first shaft support portion that supports respective first ends of a plurality of pinion shafts inserted through the pinion gears, and a plurality of first leg portions extended from the first shaft support portion to define an outer diameter of the first carrier member as measured radially between free end portions of the first leg portions;
   a second carrier member that has a second shaft support portion that supports respective second ends of the plurality of pinion shafts, and a plurality of second leg portions extended from the second shaft support portion to define an outer diameter of the second carrier member as measured radially between free end portions of the second leg portions, the outer diameter of the first carrier member being the same as the outer diameter of the second carrier member; and
   an annular member that has one end surface with which the plurality of first leg portions of the first carrier member and the plurality of second leg portions of the second carrier member are brought into abutment such that the first leg portions and the second leg portions abut the one end surface along a same plane relative to an axial direction, and a welded portion to which the plurality of first leg portions and the plurality of second leg portions are welded at different positions in a circumferential direction.

2. The planetary carrier according to claim 1, wherein the plurality of first leg portions and the plurality of second leg portions abut against the one end surface of the annular member at different positions in the circumferential direction.

3. The planetary carrier according to claim 1, wherein an annular projection portion that projects in the axial direction to surround the one end surface is formed on the annular member, and the welded portion is an inner peripheral surface of the annular projection portion.

4. The planetary carrier according to claim 3, wherein distal ends of the free end portions of the first and second leg portions are each formed in an arcuate shape.

5. The planetary carrier according to claim 1, wherein:
   the free end portions of the plurality of first leg portions abut against the one end surface of the annular member, and at least a part of the first carrier member is disposed on an inner peripheral side of the annular member; and
   the second carrier member is disposed such that the plurality of second leg portions abut against the one end surface of the annular member and the second shaft support portion faces the first shaft support portion of the first carrier member.

6. The planetary carrier according to claim 1, wherein the first leg portions each include a basal portion extended in the axial direction from the first shaft support portion, and the free end portion extended outward in a radial direction from the basal portion.

7. The planetary carrier according to claim 6, wherein the basal portions of the first leg portions are extended from the first shaft support portion via bent portions.

8. The planetary carrier according to claim 1, further comprising:
   a plurality of second pinion gears that are shorter than the pinion gears;
   a plurality of second pinion shafts inserted through the second pinion gears; and
   a center plate that has pinion shaft insertion portions through which the pinion shafts supported by the first carrier member and the second carrier member are inserted, and abutment portions that are brought into abutment with the one end surface of the annular member, the center plate being configured to support the second pinion shafts together with at least one of the first and second carrier members, wherein
   the abutment portions are welded to the welded portion at positions that are different in the circumferential direction from positions at which the plurality of first leg portions and the plurality of second leg portions are welded to the welded portion.

9. The planetary carrier according to claim 8, wherein both ends of the plurality of second pinion shafts are supported by the first and second carrier members.

\* \* \* \* \*